United States Patent
Gao et al.

(10) Patent No.: US 11,166,284 B2
(45) Date of Patent: Nov. 2, 2021

(54) DATA TRANSMISSION METHOD, TERMINAL, AND BASE STATION

(71) Applicant: CHINA ACADEMY OF TELECOMMUNICATIONS TECHNOLOGY, Beijing (CN)

(72) Inventors: Xuejuan Gao, Beijing (CN);
Ekpenyong Tony, Beijing (CN);
Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 104 days.

(21) Appl. No.: 16/611,206

(22) PCT Filed: Apr. 18, 2018

(86) PCT No.: PCT/CN2018/083603
§ 371 (c)(1),
(2) Date: Nov. 5, 2019

(87) PCT Pub. No.: WO2018/201903
PCT Pub. Date: Nov. 8, 2018

(65) Prior Publication Data
US 2020/0170018 A1     May 28, 2020

(30) Foreign Application Priority Data
May 5, 2017   (CN) .......................... 201710314193.1

(51) Int. Cl.
*H04W 72/04*     (2009.01)
*H04L 1/18*      (2006.01)
*H04W 28/04*     (2009.01)

(52) U.S. Cl.
CPC ....... *H04W 72/0493* (2013.01); *H04L 1/1812* (2013.01); *H04W 28/04* (2013.01); *H04W 72/042* (2013.01)

(58) Field of Classification Search
None
See application file for complete search history.

(56) References Cited

U.S. PATENT DOCUMENTS

| 2012/0002657 | A1 | 1/2012 | Seyama et al. | |
| 2017/0310431 | A1* | 10/2017 | Iyer | H04L 1/1819 |
| 2018/0269898 | A1* | 9/2018 | Sun | H04L 1/0083 |

FOREIGN PATENT DOCUMENTS

| CN | 101060481 A | 10/2007 |
| CN | 104301077 A | 1/2015 |

(Continued)

OTHER PUBLICATIONS

Lenzi et al. "Code Block Segmentation Hardware Architecture for LTE-Advanced" IEEE Wireless Communications and Networking and Conference (Year: 2013).*

(Continued)

*Primary Examiner* — Jamaal Henson
(74) *Attorney, Agent, or Firm* — Kilpatrick Townsend & Stockton LLP

(57) ABSTRACT

Disclosed are a data transmission method, a terminal, and a base station. Determined is that a TB needs to be divided into M CBG; grouping, according to a preset grouping scheme, multiple CB produced when the one TB is code block segmented, thus diving the one TB into the M CBG; and transmitting data according to the M CBG, where M is a positive integer. The technical solution of the present invention solves the technical problem of low data transmission efficiency and low resource utilization rate in an LTE system found in the prior art.

12 Claims, 3 Drawing Sheets

(56) References Cited

FOREIGN PATENT DOCUMENTS

| EP | 3499771 A1 | 6/2019 |
|---|---|---|
| WO | 2016126330 A1 | 8/2016 |
| WO | 2016165575 A1 | 10/2016 |

OTHER PUBLICATIONS

CATT: "Discussion on NR HARQ-ACK feedback mechanisms"; 3GPP TSG RAN WG1 Meeting #88bis; R1-1704583; Spokane, USA, Apr. 3-7, 2017.
Samsung: "Overview of CBG-based retransmission in NR"; 3GPP TSG RAN WG1 Meeting #88bis R1-1705401; Spokane, USA, Apr. 3-7, 2017.
Huawei, HiSilicon: "Code Block Segmentation", 3GPP TSG RAN WG1 Meeting #88bis, R1-1705087, Spokane, USA Apr. 3-7, 2017.
LG Electronics,"Discussion on CB group based HARQ operation",3GPP TSG RAN WG1 Meeting #88bis, Spokane, USA Apr. 3-7, 2017, total 4 pages, R1-1704916.

\* cited by examiner

DATA TRANSMISSION METHOD, TERMINAL, AND BASE STATION

The present application is a US National Stage of International Application No. PCT/CN2018/083603, filed Apr. 18, 2018, which claims priority to Chinese Patent Application No. 201710314193.1, filed with the Chinese Patent Office on May 5, 2017 and entitled "Data Transmission Method, User equipment, and Base Station", which is hereby incorporated by reference in its entirety.

FIELD

The invention relates to the communication field and particularly to a data transmission method, a user equipment and a base station.

BACKGROUND

In the Long Term Evolution (LTE) system, the Physical Downlink Shared CHannel (PDSCH) and Physical Uplink Shared CHannel (PUSCH) are used to carry the downlink data transmission and uplink data transmission respectively. Each transmission is performed in unit of Transport Block (TB), and one PDSCH/PUSCH can support one or two TB transmission according to different transmission modes configured. In the case of downlink transmission, after receiving a PDSCH, the user equipment needs to perform the ACK (ACKnowledgement)/NACK (Non-ACKnowledgement) feedback for the TB transmitted in the PDSCH. The ACK/NACK feedback is performed for the TB, that is, each TB corresponds to 1 bit of ACK/NACK feedback information for representing whether the reception of the TB is correct when the spatial bundling is not used. When the PDSCH is configured to be transmitted by multiple TBs and the spatial bundling is used, there is a need to perform the logical "and" operation on the ACK/NACK feedback information corresponding to each TB carried in one PDSCH to obtain 1 bit of ACK/NACK feedback information. The uplink transmission is similar.

Due to the complexity limitation of the encoder, one TB needs to be divided into i Code Blocks (CBs). Each CB is encoded and added with the Cyclic Redundancy Check (CRC) respectively, and a plurality of encoded CBs are cascaded together for mapping and transmission. Since each CB is encoded independently and includes the CRC information, the ACK/NACK feedback information can be generated actually for each CB. But if the ACK/NACK feedback is made for each CB, one TB needs to correspond to K bits of ACK/NACK feedback information and the feedback quantity is relatively large. In the LTE system, in order to reduce the ACK/NACK feedback quantity, the ACK/NACK feedback is only made for the TB, that is, one TB is received correctly only when all the CBs in this TB are received correctly, and the user equipment may feed back the ACK as the feedback information. The feedback information of this TB is NACK as long as one CB in this TB is received incorrectly, and then the base station side needs to retransmit this TB.

With the development change of the mobile communication service demand, the International Telecommunication Union (ITU), the 3rd Generation Partnership Project (3GPP) and other organizations all begin to research the new wireless communication system (5 Generation New RAT (5G NR).

As can be seen, the technical problem exists in the prior art that the data transmission efficiency is low and the resource utilization rate is low in the LTE system.

SUMMARY

In order to solve the technical problem in the prior art that the data transmission efficiency is low and the resource utilization rate is low in the LTE system, the embodiments of the invention provide a data transmission method, a user equipment and a base station, in which it is determined that one TB needs to be divided into M Code Block Groups (CBGs); a plurality of CBs obtained by the code block segmentation of the one TB are grouped according to the preset grouping scheme to thereby divide the one TB into the M CBGs; and the data is transmitted based on the M CBGs, wherein M is a positive integer. The data transmission method is applicable to the user equipment or base station.

In order for the better understanding of the embodiments of the invention, the specific description of the CBG in the embodiments of the invention is as follows.

The transmission and ACK/NACK feedback concept based on CBG is proposed in the 5G NR. For example, after i CBs are obtained by the code block segmentation of one TB, the i CBs can be divided into a plurality of CBGs in accordance with the certain rule. Each CBG can include only one CB or can include j CBs (i.e., one TB), wherein j is a positive integer greater than or equal to 1 and less than or equal to i.

The ACK/NACK can be feed back based on CBG that is, one CBG can have one or more bits of ACK/NACK feedback information, so that the CBG-based retransmission with less granularity can be supported on the basis of increasing the ACK/NACK feedback overhead to some extent. The support of CBG-based retransmission only allows the retransmission of the CBG which is transmitted incorrectly and corresponds to the same TB and HARQ process. The user equipment can be configured as to whether to start the CBG-based retransmission through the high-level signaling.

In a first aspect, a first embodiment of the invention provides a data transmission method. The method includes: determining, by a user equipment, that one TB needs to be divided into M CBGs; grouping, by the user equipment, one or more CBs obtained by code block segmentation of the one TB according to a preset grouping scheme to thereby divide the one TB into the M CBGs; and transmitting, by the user equipment, data based on the M CBGs, wherein M is a positive integer.

Optionally, determining, by the user equipment, that one TB needs to be divided into M CBGs, includes: determining, by the user equipment, according to a predefined rule that one TB needs to be divided into M CBGs; or determining, by the user equipment, according to configuration information that one TB needs to be divided into M CBGs.

Optionally, the user equipment receives the configuration information through a high-level signaling; or the user equipment receives the configuration information through a downlink control channel.

Optionally, the configuration information includes: a user equipment-specific configuration information; or configuration information shared by a plurality of user equipments, wherein the user equipment is one of the plurality of user equipments.

Optionally, grouping, by the user equipment, one or more CBs obtained by code block segmentation of the one TB according to a preset grouping scheme to thereby divide the TB into the M CBGs, includes: determining, by the user equipment, the number of CBs in each of the M CBGs according to the preset grouping scheme; and dividing, by the user equipment, the TB into the M CBGs based on the determined number of CBs in each of the M CBGs.

Optionally, determining, by the user equipment, the number of CBs in each of the M CBGs according to the preset grouping scheme, includes: defining, by the user equipment, r=C mod M, wherein C is the number of CBs obtained by code block segmentation of one TB, and r is a remainder of C divisible by M; and determining, by the user equipment, the number $N_k$ of CBs included in $CBG_k$ of the M CBGs as:

$$N_k = \left\lfloor \frac{C}{M} \right\rfloor,$$

wherein k is an integer greater than or equal to 0 and less than M−r;

$$N_k = \left\lfloor \frac{C}{M} \right\rfloor + 1 \text{ or } N_k = \left\lfloor \frac{C}{M} \right\rfloor,$$

wherein k is an integer greater than or equal to M−r and less than M.

Optionally, determining, by the user equipment, the number of CBs in each of the M CBGs according to the preset grouping scheme, includes: defining r=C mod M, wherein C is the number of CBs obtained by code block segmentation of one TB, and r is a remainder of C divisible by M; and determining, by the user equipment, the number $N_k$ of CBs included in $CBG_k$ of the M CBGs as:

$$N_k = \left\lceil \frac{C}{M} \right\rceil - 1 \text{ or } N_k = \left\lfloor \frac{C}{M} \right\rfloor,$$

wherein k is an integer greater than or equal to 0 and less than M−r;

$$N_k = \left\lfloor \frac{C}{M} \right\rfloor,$$

wherein k is an integer greater than or equal to M−r and less than M.

Optionally, determining, by the user equipment, the number of CBs in each of the M CBGs according to the preset grouping scheme, includes: defining r=C mod M, wherein C is the number of CBs obtained by code block segmentation of one TB, and r is a remainder of C divisible by M; and determining, by the user equipment, the number $N_k$ of CBs included in $CBG_k$ of the M CBGs as:

$$N_k = \left\lfloor \frac{C}{M} \right\rfloor + 1 \text{ or } N_k = \left\lfloor \frac{C}{M} \right\rfloor,$$

wherein k is an integer greater than or equal to 0 and less than r;

$$N_k = \left\lfloor \frac{C}{M} \right\rfloor,$$

wherein k is an integer greater than or equal to r and less than M.

Optionally, determining, by the user equipment, the number of CBs in each of the M CBGs according to the preset grouping scheme, includes: defining r=C mod M, wherein C is the number of CBs obtained by code block segmentation of one TB, and r is a remainder of C divisible by M; and determining, by the user equipment, the number $N_k$ of CBs included in $CBG_k$ of the M CBGs as:

$$N_k = \left\lfloor \frac{C}{M} \right\rfloor,$$

wherein k is an integer greater than or equal to 0 and less than r;

$$N_k = \left\lceil \frac{C}{M} \right\rceil - 1 \text{ or } N_k = \left\lfloor \frac{C}{M} \right\rfloor,$$

wherein k is an integer greater than or equal to r and less than M.

In a second aspect, a second embodiment of the invention provides a data transmission method. The method includes: determining, by a base station, that one TB needs to be divided into M CBGs; grouping, by the base station, one or more CBs obtained by code block segmentation of the one TB according to a preset grouping scheme to thereby divide the one TB into the M CBGs; and transmitting, by the base station, data based on the M CBGs, wherein M is a positive integer.

Optionally, determining, by the base station, that one TB needs to be divided into M CBGs, includes: determining, by the base station, according to a predefined rule that one TB needs to be divided into M CBGs; or selecting, by the base station, one of a plurality of predefined M values as the number of CBGs into which one TB needs to be divided, and notifying a user equipment of the M value through configuration information.

Optionally, the base station sends the configuration information through a high-level signaling; or the base station sends the configuration information through a downlink control channel.

Optionally, the base station notifies the user equipment of the M value through a user equipment-specific configuration information; or the base station notifies the user equipment of the M value through configuration information shared by a plurality of user equipments.

Optionally, grouping, by the base station, one or more CBs obtained by code block segmentation of the one TB according to a preset grouping scheme to thereby divide the TB into the M CBGs, includes: determining, by the base station, the number of CBs in each of the M CBGs according to the preset grouping scheme; and dividing, by the base station, the TB into the M CBGs based on the determined number of CBs in each of the M CBGs.

Optionally, determining, by the base station, the number of CBs in each of the M CBGs according to the preset grouping scheme, includes: defining, by the base station, r=C mod M, wherein C is the number of CBs obtained by code block segmentation of one TB, and r is a remainder of C divisible by M; and determining, by the base station, the number $N_k$ of CBs included in $CBG_k$ of the M CBGs as:

$$N_k = \left\lfloor \frac{C}{M} \right\rfloor,$$

wherein k is an integer greater than or equal to 0 and less than M−r;

$$N_k = \left\lfloor \frac{C}{M} \right\rfloor + 1 \text{ or } N_k = \left\lfloor \frac{C}{M} \right\rfloor,$$

wherein k is an integer greater than or equal to M−r and less than M.

Optionally, determining, by the base station, the number of CBs in each of the M CBGs according to the preset grouping scheme, includes: defining r=C mod M, wherein C is the number of CBs obtained by code block segmentation of one TB, and r is a remainder of C divisible by M; and determining, by the base station, the number $N_k$ of CBs included in $CBG_k$ of the M CBGs as:

$$N_k = \left\lceil \frac{C}{M} \right\rceil - 1 \text{ or } N_k = \left\lfloor \frac{C}{M} \right\rfloor,$$

wherein k is an integer greater than or equal to 0 and less than M−r;

$$N_k = \left\lfloor \frac{C}{M} \right\rfloor,$$

wherein k is an integer greater than or equal to M−r and less than M.

Optionally, determining, by the base station, the number of CBs in each of the M CBGs according to the preset grouping scheme, includes: defining r=C mod M, wherein C is the number of CBs obtained by code block segmentation of one TB, and r is a remainder of C divisible by M; and determining, by the base station, the number $N_k$ of CBs included in $CBG_k$ of the M CBGs as:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than r;

$$N_k = \left\lceil \frac{C}{M} \right\rceil,$$

wherein k is an integer greater than or equal to r and less than M.

Optionally, determining, by the base station, the number of CBs in each of the M CBGs according to the preset grouping scheme, includes: defining r=C mod M, wherein C is the number of CBs obtained by code block segmentation of one TB, and r is a remainder of C divisible by M; and determining, by the base station, the number $N_k$ of CBs included in $CBG_k$ of the M CBGs as:

$$N_k = \left\lceil \frac{C}{M} \right\rceil,$$

wherein k is an integer greater than or equal to 0 and less than r;

$$N_k = \left\lceil \frac{C}{M} \right\rceil - 1 \text{ or } N_k = \left\lceil \frac{C}{M} \right\rceil,$$

wherein k is an integer greater than or equal to r and less than M.

In a third aspect, a third embodiment of the invention provides a user equipment. The user equipment includes: a determining device configured to determine that one TB needs to be divided into M CBGs; a grouping device configured to group one or more CBs obtained by code block segmentation of the one TB according to a preset grouping scheme to thereby divide the one TB into the M CBGs; and a data transmission device configured to transmit data based on the M CBGs, wherein M is a positive integer.

Optionally, the determining device includes: a first determining subdevice configured to determine according to a predefined rule that one TB needs to be divided into M CBGs; or a second determining subdevice configured to determine according to configuration information that one TB needs to be divided into M CBGs.

Optionally, the user equipment receives the configuration information through a high-level signaling; or the user equipment receives the configuration information through a downlink control channel.

Optionally, the configuration information includes: a user equipment-specific configuration information; or configuration information shared by a plurality of user equipments, wherein the user equipment is one of the plurality of user equipments.

Optionally, the grouping device includes: a third determining subdevice configured to determine the number of CBs in each of the M CBGs according to the preset grouping scheme; and a grouping subdevice configured to divide the TB into the M CBGs based on the determined number of CBs in each of the M CBGs.

Optionally, the third determining subdevice includes: a first defining unit configured to define r=C mod M, wherein C is the number of CBs obtained by code block segmentation of one TB, and r is a remainder of C divisible by M; and a first determining unit configured to determine the number $N_k$ of CBs included in $CBG_k$ of the M CBGs, the $N_k$ being:

$$N_k = \left\lceil \frac{C}{M} \right\rceil,$$

wherein k is an integer greater than or equal to 0 and less than M−r;

$$N_k = \left\lfloor \frac{C}{M} \right\rfloor + 1 \text{ or } N_k = \left\lceil \frac{C}{M} \right\rceil,$$

wherein k is an integer greater than or equal to M−r and less than M.

Optionally, the third determining subdevice includes: a second defining unit configured to define r=C mod M, wherein C is the number of CBs obtained by code block segmentation of one TB, and r is a remainder of C divisible by M; and a second determining unit configured to determine the number $N_k$ of CBs included in $CBG_k$ of the M CBGs, the $N_k$ being:

$$N_k = \left\lceil \frac{C}{M} \right\rceil - 1 \text{ or } N_k = \left\lceil \frac{C}{M} \right\rceil,$$

wherein k is an integer greater than or equal to 0 and less than M−r;

$$N_k = \left\lceil \frac{C}{M} \right\rceil,$$

wherein k is an integer greater than or equal to M−r and less than M.

Optionally, the third determining subdevice includes: a third defining unit configured to define r=C mod M, wherein C is the number of CBs obtained by code block segmentation of one TB, and r is a remainder of C divisible by M; and a third determining unit configured to determine the number $N_k$ of CBs included in $CBG_k$ of the M CBGs, the $N_k$ being:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than r;

$$N_k = \left\lceil \frac{C}{M} \right\rceil,$$

wherein k is an integer greater than or equal to r and less than M.

Optionally, the third determining subdevice includes: a fourth defining unit configured to define r=C mod M, wherein C is the number of CBs obtained by code block segmentation of one TB, and r is a remainder of C divisible by M; and a fourth determining unit configured to determine the number $N_k$ of CBs included in $CBG_k$ of the M CBGs, the $N_k$ being:

$$N_k = \left\lceil \frac{C}{M} \right\rceil,$$

wherein k is an integer greater than or equal to 0 and less than r;

$$N_k = \left\lceil \frac{C}{M} \right\rceil - 1 \text{ or } N_k = \left\lceil \frac{C}{M} \right\rceil,$$

wherein k is an integer greater than or equal to r and less than M.

In a fourth aspect, a fourth embodiment of the invention provides a base station. The base station includes: a determining device configured to determine that one TB needs to be divided into M CBGs; a grouping device configured to group one or more CBs obtained by code block segmentation of the one TB according to a preset grouping scheme to thereby divide the one TB into the M CBGs; and a data transmission device configured to transmit data based on the M CBGs, wherein M is a positive integer.

Optionally, the determining device includes: a first determining subdevice configured to determine according to a predefined rule that one TB needs to be divided into M CBGs; or a second determining subdevice configured to select one of a plurality of predefined M values as the number of CBGs into which one TB needs to be divided, and notify a user equipment of the M value through configuration information.

Optionally, the base station further includes a sending device configured to send the configuration information through a high-level signaling; or configured to send the configuration information through a downlink control channel.

Optionally, the sending device is further configured to notify the user equipment of the M value through a user equipment-specific configuration information; or notify the user equipment of the M value through configuration information shared by a plurality of user equipments.

Optionally, the grouping device includes: a third determining subdevice configured to determine the number of CBs in each of the M CBGs according to the preset grouping scheme; and a grouping subdevice configured to divide the TB into the M CBGs based on the determined number of CBs in each of the M CBGs.

Optionally, the third determining subdevice includes: a first defining unit configured to define r=C mod M, wherein C is the number of CBs obtained by code block segmentation of one TB, and r is a remainder of C divisible by M; and a first determining unit configured to determine the number $N_k$ of CBs included in $CBG_k$ of the M CBGs, the $N_k$ being:

$$N_k = \left\lceil \frac{C}{M} \right\rceil,$$

wherein k is an integer greater than or equal to 0 and less than M−r;

$$N_k = \left\lfloor \frac{C}{M} \right\rfloor + 1 \text{ or } N_k = \left\lceil \frac{C}{M} \right\rceil,$$

wherein k is an integer greater than or equal to M−r and less than M.

Optionally, the third determining subdevice includes: a second defining unit configured to define r=C mod M, wherein C is the number of CBs obtained by code block segmentation of one TB, and r is a remainder of C divisible by M; and a second determining unit configured to determine the number $N_k$ of CBs included in $CBG_k$ of the M CBGs, the $N_k$ being:

$$N_k = \left\lceil \frac{C}{M} \right\rceil - 1 \text{ or } N_k = \left\lceil \frac{C}{M} \right\rceil,$$

wherein k is an integer greater than or equal to 0 and less than M−r;

$$N_k = \left\lceil \frac{C}{M} \right\rceil,$$

wherein k is an integer greater than or equal to M−r and less than M.

Optionally, the third determining subdevice includes: a third defining unit configured to define r=C mod M, wherein C is the number of CBs obtained by code block segmentation of one TB, and r is a remainder of C divisible by M; and a third determining unit configured to determine the number $N_k$ of CBs included in $CBG_k$ of the M CBGs, the $N_k$ being:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than r;

$$N_k = \left\lceil \frac{C}{M} \right\rceil,$$

wherein k is an integer greater than or equal to r and less than M.

Optionally, the third determining subdevice includes: a fourth defining unit configured to define r=C mod M, wherein C is the number of CBs obtained after code block segmentation of one TB, and r is a remainder of C divisible by M; and a fourth determining unit configured to determine the number $N_k$ of CBs included in $CBG_k$ of the M CBGs, the $N_k$ being:

$$N_k = \left\lceil \frac{C}{M} \right\rceil,$$

wherein k is an integer greater than or equal to 0 and less than r;

$$N_k = \left\lceil \frac{C}{M} \right\rceil - 1 \text{ or } N_k = \left\lceil \frac{C}{M} \right\rceil,$$

wherein k is an integer greater than or equal to r and less than M.

In a fifth aspect, a fifth embodiment of the invention provides a computer device, which includes a processor configured, when executing a computer program stored in a memory, to implement the method described in the first or second aspect.

In a sixth aspect, a sixth embodiment of the invention provides a computer readable storage medium storing a computer program thereon, where the computer program, when executed by a processor, implement the method described in the first or second aspect.

The data transmission method, user equipment, and base station in the embodiments of the invention, the CBs can be divided into the CBGs, to support the CBG-based retransmission and ACK/NACK feedback, solve the above technical problem in the prior art, and achieve the technical effect of reducing the unnecessary retransmission redundancy and increasing the transmission efficiency when performing the data transmission in the LTE system.

DETAILED DESCRIPTION

In order to solve the technical problem in the prior art that the data transmission efficiency is low and the resource utilization rate is low in the LTE system, the embodiments of the invention provide a data transmission method, a user equipment and a base station. In the embodiments of the invention, it is determined that one TB needs to be divided into M CBGs, a plurality of CBs obtained by the code block segmentation of the TB are grouped according to the preset grouping scheme to thereby divide the TB into M CBGs, and the data is transmitted based on M CBGs. Here, M is a positive integer. The CB grouping method is applicable to the user equipment or base station.

In order for the better understanding of the above technical solution, the above technical solution will be illustrated below in details in combination with the drawings of the specification and the embodiments.

Figure 1:
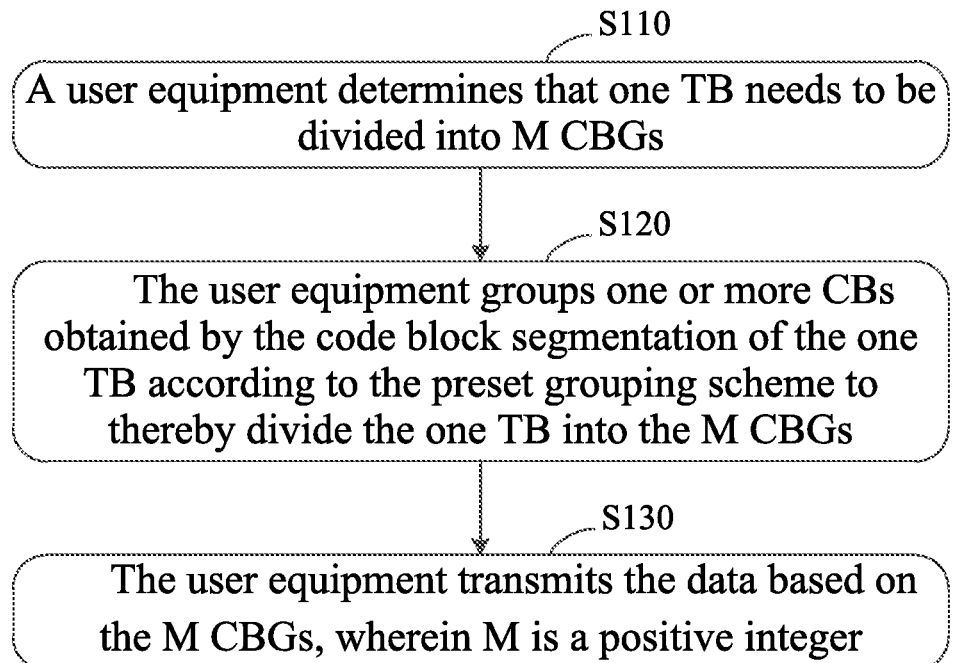
FIG. 1 is a first flow chart of a data transmission method in accordance with an embodiment of the invention.

Referring to FIG. 1, the first embodiment of the invention provides a data transmission method, which includes the following steps.

S110: a user equipment determines that one TB needs to be divided into M CBGs.

S120: the user equipment groups one or more CBs obtained by code block segmentation of the one TB according to the preset grouping scheme to thereby divide the one TB into the M CBGs.

S130: the user equipment transmits the data based on the M CBGs.

Here, M is a positive integer.

The step S110 specifically includes: the user equipment determines according to the predefined rule that one TB needs to be divided into M CBGs; or the user equipment determines according to the configuration information that one TB needs to be divided into M CBGs.

Here, the user equipment can receive the configuration information in the following ways: the user equipment receives the configuration information through the high-level signaling; or the user equipment receives the configuration information through the downlink control channel.

The configuration information includes: the user equipment-specific configuration information; or the configuration information shared by a plurality of user equipments, wherein the user equipment is one of the plurality of user equipments.

The M values corresponding to the TBs with different Transport Block Sizes (TBSs) can be same or different. The user equipment can also determine the codebook size as M bits when the ACK/NACK feedback is made on the one TB.

Here, one or more CBs obtained by code block segmentation of the one TB can implement with the schemes in the LTE system.

The step S120 specifically includes: the user equipment determines the number of CBs in each of the M CBGs according to the preset grouping scheme; and the user equipment divides the TB into the M CBGs based on the determined number of CBs in each of the M CBGs. That is to say, each of the M CBGs includes a group of CBs.

Here, the user equipment can determine the number of CBs in each CGB of the M CBGs according to the preset grouping scheme in four ways as follows (but not limited to these four ways).

First Implementation

The user equipment defines r=C mod M, wherein C is the number of CBs obtained by the code block segmentation of one TB, and r is the remainder of C divisible by M.

According to the different marking ways of the subscript k of the $CBG_k$ (for example, k is marked from 0 to M−1 or k is marked from 1 to M, and of course, k can also be marked in other ways, which are omitted here), the ways in which the user equipment determines the number $N_k$ of CBs includes in $CBG_k$ of the M CBGs can be classified as the ways a1 and b1.

The way a1 is:

$$N_k = \left\lfloor \frac{C}{M} \right\rfloor,$$

wherein 0≤k<M−r; or $$N_k = \left\lfloor \frac{C}{M} \right\rfloor + 1 \text{ or } N_k = \left\lceil \frac{C}{M} \right\rceil,$$

wherein M−r≤k<m.

The way b1 is:

$$N_k = \left\lfloor \frac{C}{M} \right\rfloor,$$

wherein 1≤k≤M−r; or $$N_k = \left\lfloor \frac{C}{M} \right\rfloor + 1 \text{ or } N_k = \left\lceil \frac{C}{M} \right\rceil,$$

wherein M−r≤k≤M.

Specifically, for the way a1, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lfloor 18/4 \rfloor=4$ CBs, $CBG_2$ and $CBG_3$ include $N_2=N_3=\lfloor 18/4 \rfloor+1=5$ CBs, or $CBG_2$ and $CBG_3$ include $N_2=N_3=\lceil 18/4 \rceil=5$ CBs.

Specifically, for the way a1, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$ includes $N_0=\lfloor 19/4 \rfloor=4$ CBs, $CBG_1$, $CBG_2$ and $CBG_3$ includes $N_1=N_2=N_3=\lfloor 19/4 \rfloor+1=5$ CBs, or $CBG_1$, $CBG_2$ and $CBG_3$ include $N_1=N_2=N_3=\lceil 19/4 \rceil=5$ CBs.

For the way b1, it is assumed that M=4, one TB is divided into C=18 TBs according to the CB division definition, and r=18 mod 4=2, then in accordance with the above calculation mode, the number $N_k$ of CBs includes in $CBG_k$ of 4 CBGs is: $CBG_1$ and $CBG_2$ include $N_1=N_2=\lfloor 18/4 \rfloor=4$ CBs, $CBG_3$ and $CBG_4$ include $N_3=N_4=\lfloor 18/4 \rfloor+1=5$ CBs, or $CBG_3$ and $CBG_4$ include $N_3=N_4=\lceil 18/4 \rceil=5$ CBs.

Second Implementation

The user equipment defines r=C mod M, wherein C is the number of CBs obtained by the code block segmentation of one TB, and r is the remainder of C divisible by M.

According to the different marking ways of the subscript k of the $CBG_k$ (for example, k is marked from 0 to M−1 or k is marked from 1 to M, and of course, k can also be marked in other ways, which are omitted here), the ways in which the user equipment determines the number $N_k$ of CBs included in $CBG_k$ of the M CBGs can be classified as the ways a2 and b2.

The way a2 is:

$$N_k = \left\lceil \frac{C}{M} \right\rceil - 1 \text{ or } N_k = \left\lfloor \frac{C}{M} \right\rfloor,$$

wherein 0≤k≤M−r; or $$N_k = \left\lceil \frac{C}{M} \right\rceil,$$

wherein M−r≤k<M.

The way b2 is:

$$N_k = \left\lceil \frac{C}{M} \right\rceil - 1 \text{ or } N_k = \left\lfloor \frac{C}{M} \right\rfloor,$$

wherein 1≤k≤M−r; or $$N_k = \left\lceil \frac{C}{M} \right\rceil,$$

wherein M−r<k≤M.

Specifically, for the way a2, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil-1=4$ CBs, or $CBG_0$ and $CBG_1$ include $N_0=N_1=\lfloor 18/4 \rfloor=4$ CBs, $CBG_2$ and $CBG_3$ include $N_2=N_3=\lceil 18/4 \rceil=5$ CBs.

Specifically, for the way a2, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$ includes $N_0=\lceil 19/4 \rceil-1=4$ CBs, or $CBG_0$ includes $N_0=\lfloor 19/4 \rfloor=4$ CBs; $CBG_1$, $CBG_2$ and $CBG_3$ include $N_1=N_2=N_3=\lceil 19/4 \rceil=5$ CBs.

For the way b2, it is assumed that M=4, one TB is divided into C=18 TBs according to the CB division definition, and r=18 mod 4=2, then in accordance with the above calculation mode, the number $N_k$ of CBs included in $CBG_k$ of 4

CBGs is: $CBG_1$ and $CBG_2$ include $N_1=N_2=\lceil 18/4 \rceil-1=4$ CBs, or $CBG_1$ and $CBG_2$ include $N_1=N_2=\lfloor 18/4 \rfloor=4$ CBs; $CBG_3$ and $CBG_4$ include $N_3=N_4=\lceil 18/4 \rceil=5$ CBs.

Third Implementation

The user equipment defines $r=C \mod M$, wherein C is the number of CBs obtained by the code block segmentation of one TB, and r is the remainder of C divisible by M.

According to the different marking ways of the subscript k of the $CBG_k$ (for example, k is marked from 0 to M-1 or k is marked from 1 to M, and of course, k can also be marked in other ways, which are omitted here), the ways in which the user equipment determines the number $N_k$ of CBs included in $CBG_k$ of the M CBGs can be classified as the ways a3 and b3.

The way a3 is:

$$N_k = \left\lceil \frac{C}{M} \right\rceil - 1 \text{ or } N_k = \left\lfloor \frac{C}{M} \right\rfloor,$$

wherein $0 \le k < r$; or $$N_k = \left\lfloor \frac{C}{M} \right\rfloor,$$

wherein $r \le k < M$.

The way b3 is:

$$N_k = \left\lfloor \frac{C}{M} \right\rfloor + 1 \text{ or } N_k = \left\lceil \frac{C}{M} \right\rceil,$$

wherein $1 \le k \le r$; or $$N_k = \left\lfloor \frac{C}{M} \right\rfloor,$$

wherein $r < k \le M$.

Specifically, for the way a3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lfloor 18/4 \rfloor+1=5$ CBs, or $CBG_0$ and $CBG_1$ include $N_0=N_1=\lceil 18/4 \rceil=5$ CBs, $CBG_2$ and $CBG_3$ include $N_2=N_3=\lfloor 18/4 \rfloor=4$ CBs.

Specifically, for the way a3, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lfloor 19/4 \rfloor+1=5$ CBs, or $CBG_0$, $CBG_1$ and $CBG_2$ include $N_0=N_1=N_2=\lceil 19/4 \rceil=5$ CBs; $CBG_3$ includes $N_3=\lfloor 19/4 \rfloor=4$ CBs.

For the way b3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lfloor 18/4 \rfloor+1=5$ CBs, or $CBG_1$ and $CBG_2$ include $N_1=N_2=\lceil 18/4 \rceil=5$ CBs; $CBG_3$ and $CBG_4$ include $N_3=N_4=\lfloor 18/4 \rfloor=4$ CBs.

Fourth Implementation

The user equipment defines $r=C \mod M$, wherein C is the number of CBs obtained by the code block segmentation of one TB, and r is the remainder of C divisible by M.

According to the different marking ways of the subscript k of the $CBG_k$ (for example, k is marked from 0 to M-1 or k is marked from 1 to M, and of course, k can also be marked in other ways, which are omitted here), the ways in which the user equipment determines the number $N_k$ of CBs included in $CBG_k$ of the M CBGs can be classified as the ways a4 and b4.

The way a4 is:

$$N_k = \left\lceil \frac{C}{M} \right\rceil,$$

wherein $0 \le k < r$; or, $$N_k = \left\lceil \frac{C}{M} \right\rceil - 1 \text{ or } N_k = \left\lfloor \frac{C}{M} \right\rfloor,$$

wherein $r \le k < M$.

The way b4 is:

$$N_k = \left\lceil \frac{C}{M} \right\rceil,$$

wherein $1 \le k \le r$; or, $$N_k = \left\lceil \frac{C}{M} \right\rceil - 1 \text{ or } N_k = \left\lfloor \frac{C}{M} \right\rfloor,$$

wherein $r < k \le M$.

Specifically, for the way a4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil=5$ CBs; $CBG_2$ and $CBG_3$ include $N_2=N_3=\lceil 18/4 \rceil-1=4$ CBs, or $CBG_2$ and $CBG_3$ include $N_2=N_3=\lfloor 18/4 \rfloor=4$ CBs.

Specifically, for the way a4, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lceil 19/4 \rceil=5$ CBs; $CBG_3$ includes $N_3=\lceil 19/4 \rceil-1=4$ CBs, or $CBG_3$ includes $N_3=\lfloor 19/4 \rfloor=4$ CBs.

For the way b4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ includes $N_1=N_2=\lceil 18/4 \rceil=5$ CBs; $CBG_3$ and $CBG_4$ include $N_3=N_4=\lceil 18/4 \rceil-1=4$ CBs, or $CBG_3$ and $CBG_4$ include $N_3=N_4=\lfloor 18/4 \rfloor=4$ CBs.

Here, the number of CBs included in each CBG changes with the change in the Transport Block Size (TBS) of one TB.

The user equipment transmits the data based on the M CBGs in the step S130, which specifically includes: the user equipment performs the ACK/NACK feedback and/or retransmission based on the M CBGs.

For example, in the case of uplink data transmission, the user equipment sends one TB; the base station receives one TB, generates A bits of ACK/NACK feedback information according to each of M CBGs obtained after grouping the one TB in accordance with the preset grouping scheme, where A can be a preset value equal to or greater than 1, and sends the feedback information to the user equipment; and the user equipment can determine the CBG corresponding to each feedback information according to the same CB grouping scheme after receiving the feedback information, and then retransmit the information in the CBG of which the corresponding feedback information is NACK.

Or, in the case of downlink data transmission, the base station sends one TB; the user equipment receives one TB, generates A bits of ACK/NACK feedback information according to each of M CBGs obtained after grouping the one TB in accordance with the preset grouping scheme, where A can be a preset value equal to or greater than 1, and sends the feedback information to the base station; and the base station can determine the CBG corresponding to each feedback information according to the same CB grouping scheme after receiving the feedback information, and then retransmit the information in the CBG of which the corresponding feedback information is NACK.

Figure 2:
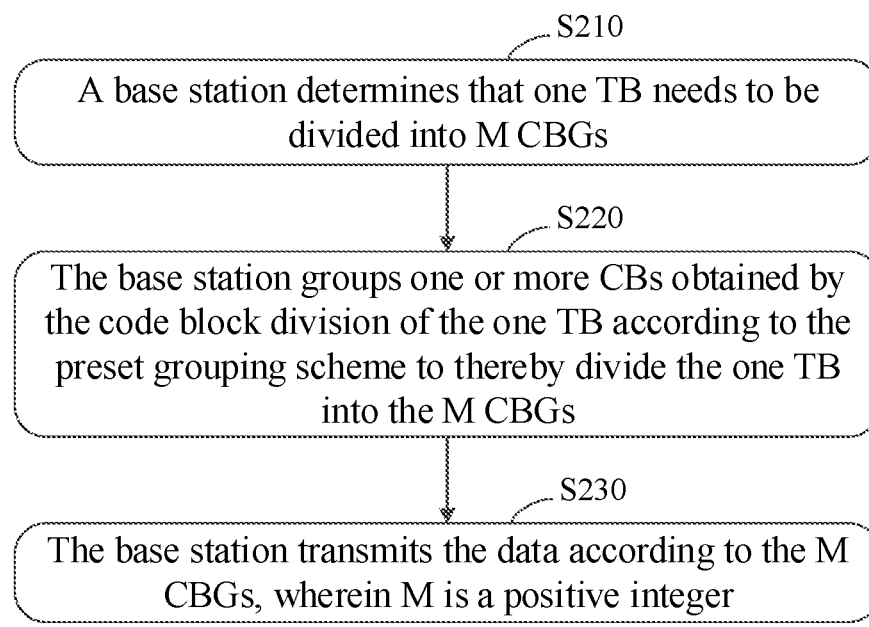
FIG. 2 is a second flow chart of a data transmission method in accordance with an embodiment of the invention.

Referring to FIG. 2, the second embodiment of the invention provides a data transmission method, which includes the following steps.

S210: a base station determines that one TB needs to be divided into M CBGs.

S220: the base station groups according to the preset grouping scheme one or more CBs obtained by the code block segmentation of one TB, to thereby divide the one TB into the M CBGs.

S230: the base station transmits the data based on the M CBGs.

Here, M is a positive integer.

The step S210 can specifically include: the base station determines according to the predefined rule that one TB needs to be divided into M CBGs.

Furthermore, the base station can also select one of a plurality of predefined M values as the number of CBGs into which one TB needs to be divided, and notify a user equipment of the M value through the configuration information, so that the user equipment can group the TBs at the user equipment side based on the configuration information. The base station sends the configuration information through the high-level signaling, or the base station sends the configuration information through the downlink control channel.

Here, the base station notifies the user equipment of the M value through the user equipment-specific configuration information; or the base station notifies the user equipment of the M value through configuration information shared by a plurality of user equipments.

The M values corresponding to the TBs with different Transport Block Sizes (TBSs) can be same or different; and the base station can also determine the codebook size as M bits when the ACK/NACK feedback is made on the one TB.

Here, one or more CBs obtained by the code block segmentation of the one TB can implement with the scheme in the LTE system.

The step S220 specifically includes: the base station determines the number of CBs in each of the M CBGs according to the preset grouping scheme; and the base station divides the TB into the M CBGs based on the determined number of CBs in each of the M CBGs. That is to say, each of the M CBGs includes a group of CBs.

Here, the base station can determine the number of CBs in each of the M CBGs according to the preset grouping scheme in four ways as follows (but not limited to these four ways).

First Implementation

The base station defines r=C mod M, wherein C is the number of CBs obtained by the code block segmentation of one TB, and r is the remainder of C divisible by M.

According to the different marking ways of the subscript k of the $CBG_k$ (for example, k is marked from 0 to M−1 or k is marked from 1 to M, and of course, k can also be marked in other ways, which are omitted here), the ways in which the base station determines the number $N_k$ of CBs included in $CBG_k$ of the M CBGs can be classified as the ways a1 and b1.

The way a1 is:

$$N_k = \left\lfloor \frac{C}{M} \right\rfloor,$$

wherein 0≤k<M−r; or $$N_k = \left\lfloor \frac{C}{M} \right\rfloor + 1 \text{ or } N_k = \left\lceil \frac{C}{M} \right\rceil,$$

wherein M−r≤k<m.

The way b1 is:

$$N_k = \left\lfloor \frac{C}{M} \right\rfloor,$$

wherein 1≤k≤M−r; or $$N_k = \left\lfloor \frac{C}{M} \right\rfloor + 1 \text{ or } N_k = \left\lceil \frac{C}{M} \right\rceil,$$

wherein M−r<k≤M.

Specifically, for the way a1, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lfloor 18/4 \rfloor=4$ CBs; $CBG_2$ and $CBG_3$ include $N_2=N_3=\lfloor 18/4 \rfloor+1=5$ CBs, or $CBG_2$ and $CBG_3$ include $N_2=N_3=\lceil 18/4 \rceil=5$ CBs.

Specifically, for the way a1, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$ includes $N_0=\lfloor 19/4 \rfloor=4$ CBs; $CBG_1$, $CBG_2$ and $CBG_3$ include $N_1=N_2=N_3=\lfloor 19/4 \rfloor+1=5$ CBs, or $CBG_1$, $CBG_2$ and $CBG_3$ include $N_1=N_2=N_3=\lceil 19/4 \rceil=5$ CBs.

For the way b1, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lfloor 18/4 \rfloor=4$ CBs; $CBG_3$ and $CBG_4$ include $N_3=N_4=\lfloor 18/4 \rfloor+1=5$ CBs, or $CBG_3$ and $CBG_4$ include $N_3=N_4=\lceil 18/4 \rceil=5$ CBs.

Second Implementation

The base station defines r=C mod M, wherein C is the number of CBs obtained by the code block segmentation of one TB, and r is the remainder of C divisible by M.

According to the different marking ways of the subscript k of the $CBG_k$ (for example, k is marked from 0 to M−1 or k is marked from 1 to M, and of course, k can also be marked in other ways, which are omitted here), the ways in which the base station determines the number $N_k$ of CBs included in $CBG_k$ of the M CBGs can be classified as the ways a2 and b2.

The way a2 is:

$$N_k = \left\lceil \frac{C}{M} \right\rceil - 1 \text{ or } N_k = \left\lfloor \frac{C}{M} \right\rfloor,$$

wherein 0≤k<M−r; or $$N_k = \left\lceil \frac{C}{M} \right\rceil$$

wherein M−r≤k<M.

The way b2 is:

$$N_k = \left\lceil \frac{C}{M} \right\rceil - 1 \text{ or } N_k = \left\lfloor \frac{C}{M} \right\rfloor,$$

wherein 1≤k≤M−r; or $$N_k = \left\lceil \frac{C}{M} \right\rceil,$$

wherein M−r<k≤M.

Specifically, for the way a2, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil-1=4$ CBs, or $CBG_0$ and $CBG_1$ include $N_0=N_1=\lfloor 18/4 \rfloor=4$ CBs; $CBG_2$ and $CBG_3$ include $N_2=N_3=\lceil 18/4 \rceil=5$ CBs.

Specifically, for the way a2, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$ includes $N_0=\lceil 19/4 \rceil-1=4$ CBs, or $CBG_0$ includes $N_0=\lfloor 19/4 \rfloor=4$ CBs; $CBG_1$, $CBG_2$ and $CBG_3$ include $N_1=N_2=N_3=\lceil 19/4 \rceil=5$ CBs.

For the way b2, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lceil 18/4 \rceil-1=4$ CBs, or $CBG_1$ and $CBG_2$ include $N_1=N_2=\lfloor 18/4 \rfloor=4$ CBs; $CBG_3$ and $CBG_4$ include $N_3=N_4=\lceil 18/4 \rceil=5$ CBs.

Third Implementation

The base station defines r=C mod M, wherein C is the number of CBs obtained by the code block segmentation of one TB, and r is the remainder of C divisible by M.

According to the different marking ways of the subscript k of the $CBG_k$ (for example, k is marked from 0 to M−1 or k is marked from 1 to M, and of course, k can also be marked in other ways, which are omitted here), the ways in which the base station determines the number $N_k$ of CBs included in $CBG_k$ of the M CBGs can be classified as the ways a3 and b3.

The way a3 is:

$$N_k = \left\lfloor \frac{C}{M} \right\rfloor + 1 \text{ or } N_k = \left\lceil \frac{C}{M} \right\rceil,$$

wherein 0≤k<r; or $$N_k = \left\lfloor \frac{C}{M} \right\rfloor,$$

wherein r≤k<M.

The way b3 is:

$$N_k = \left\lfloor \frac{C}{M} \right\rfloor + 1 \text{ or } N_k = \left\lceil \frac{C}{M} \right\rceil,$$

wherein 1≤k≤r; or $$N_k = \left\lfloor \frac{C}{M} \right\rfloor,$$

wherein r<k≤M.

Specifically, for the way a3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lfloor 18/4 \rfloor+1=5$ CBs, or $CBG_0$ and $CBG_1$ include $N_0=N_1=\lceil 18/4 \rceil=5$ CBs; $CBG_2$ and $CBG_3$ include $N_2=N_3=\lfloor 18/4 \rfloor=4$ CBs.

Specifically, for the way a3, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lfloor 19/4 \rfloor+1=5$ CBs, or $CBG_0$, $CBG_1$ and $CBG_2$ include $N_0=N_1=N_2=\lceil 19/4 \rceil=5$ CBs; $CBG_3$ includes $N_3=\lfloor 19/4 \rfloor=4$ CBs.

For the way b3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lfloor 18/4 \rfloor+1=5$ CBs, or $CBG_1$ and $CBG_2$ include $N_1=N_2=\lceil 18/4 \rceil=5$ CBs; $CBG_3$ and $CBG_4$ include $N_3=N_4=\lfloor 18/4 \rfloor=4$ CBs.

Fourth Implementation

The base station defines r=C mod M, wherein C is the number of CBs obtained by the code block segmentation of one TB, and r is the remainder of C divisible by M.

According to the different marking ways of the subscript k of the $CBG_k$ (for example, k is marked from 0 to M−1 or k is marked from 1 to M, and of course, k can also be marked in other ways, which are omitted here), the ways in which the base station determines the number $N_k$ of CBs included in $CBG_k$ of the M CBGs can be classified as the ways a4 and b4.

The way a4 is:

$$N_k = \left\lceil \frac{C}{M} \right\rceil,$$

wherein 0≤k<r; or $$N_k = \left\lceil \frac{C}{M} \right\rceil - 1 \text{ or } N_k = \left\lfloor \frac{C}{M} \right\rfloor,$$

wherein r≤k<M.

The way b4 is:

$$N_k = \left\lceil \frac{C}{M} \right\rceil,$$

wherein 1≤k≤r; or $$N_k = \left\lceil \frac{C}{M} \right\rceil - 1 \text{ or } N_k = \left\lfloor \frac{C}{M} \right\rfloor,$$

wherein r<k≤M.

Specifically, for the way a4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil=5$ CBs; $CBG_2$ and $CBG_3$ include $N_2=N_3=\lceil 18/4 \rceil-1=4$ CBs, or $CBG_2$ and $CBG_3$ include $N_2=N_3=\lfloor 18/4 \rfloor=4$ CBs.

Specifically, for the way a4, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lceil 19/4 \rceil=5$ CBs; $CBG_3$ includes $N_3=\lceil 19/4 \rceil-1=4$ CBs, or $CBG_3$ includes $N_3=\lfloor 19/4 \rfloor=4$ CBs.

For the way b4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lceil 18/4 \rceil=5$ CBs; $CBG_3$ and $CBG_4$ include $N_3=N_4=\lceil 18/4 \rceil-1=4$ CBs, or $CBG_3$ and $CBG_4$ include $N_3=N_4=\lfloor 18/4 \rfloor=4$ CBs.

Here, the number of CBs included in each CBG changes with the change in the Transport Block Size (TBS) of one TB.

The base station transmits the data based on the M CBGs in the step S230, which specifically includes: the base station performs the ACK/NACK feedback and/or retransmission based on the M CBGs.

For example, in the case of uplink data transmission, the user equipment sends one TB; the base station receives one TB, generates A bits of ACK/NACK feedback information according to each of M CBGs obtained after grouping the one TB in accordance with the preset grouping scheme, where A can be a preset value equal to or greater than 1, and sends the feedback information to the user equipment; and the user equipment can determine the CBG corresponding to each feedback information according to the same CB grouping scheme after receiving the feedback information, and then retransmit the information in the CBG of which the corresponding feedback information is NACK.

Or, in the case of downlink data transmission, the base station sends one TB; the user equipment receives one TB, generates A bits of ACK/NACK feedback information according to each of M CBGs obtained after grouping the one TB in accordance with the preset grouping scheme, where A can be a preset value equal to or greater than 1, and sends the feedback information to the base station; and the base station can determine the CBG corresponding to each feedback information according to the same CB grouping scheme after receiving the feedback information, and then retransmit the information in the CBG of which the corresponding feedback information is NACK.

Figure 3:
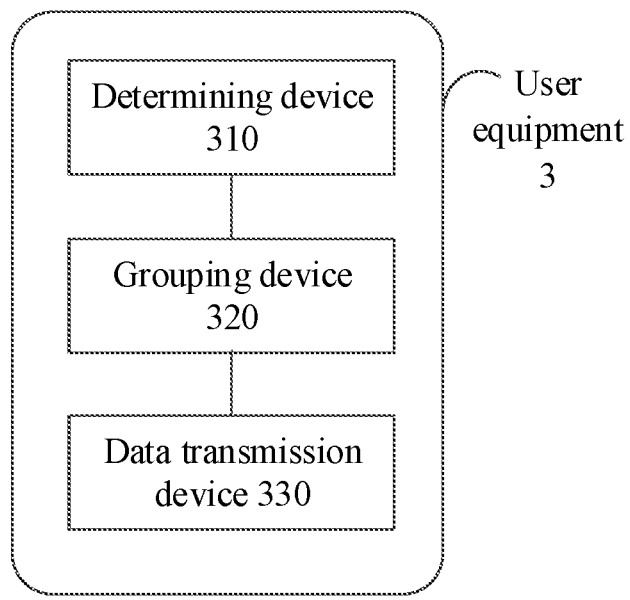
FIG. 3 is a schematic diagram of a user equipment in accordance with an embodiment of the invention.

Referring to FIG. 3, the third embodiment of the invention provides a user equipment 3 which can implement the method flow performed at the user equipment side in the above embodiments. The user equipment 3 includes:

a determining device 310 configured to determine that one TB needs to be divided into M CBGs; a grouping device 320 configured to group one or more CBs obtained by the code block segmentation of the one TB according to the preset grouping scheme, to thereby divide the one TB into the M CBGs; and a data transmission device 330 configured to transmit the data based on the M CBGs.

Here, M is a positive integer.

The determining device 310 can include: a first determining subdevice configured to determine according to the predefined rule that one TB needs to be divided into M CBGs; or a second determining subdevice configured to determine according to the configuration information that one TB needs to be divided into M CBGs.

Here, the user equipment receives the configuration information through the high-level signaling; or the user equipment receives the configuration information through the downlink control channel.

The configuration information can further include: the user equipment-specific configuration information; or the configuration information shared by a plurality of user equipments, wherein the user equipment is one of the plurality of user equipments.

The M values corresponding to the TBs with different Transport Block Sizes (TBSs) can be same or different; and the user equipment can also determine the codebook size as M bits when the ACK/NACK feedback is made on the one TB.

The grouping device 320 includes: a third determining subdevice configured to determine the number of CBs in each of the M CBGs according to the preset grouping scheme; and a grouping subdevice configured to divide the TB into the M CBGs based on the determined number of CBs in each of the M CBGs. That is to say, each of the M CBGs includes a group of CBs. Here, the third determining subdevice can determine the number of CBs in each of the M CBGs according to the preset grouping scheme in four ways as follows (but not limited to these four ways).

First Implementation

The third determining subdevice includes a first defining unit and a first determining unit. The first defining unit is configured to define r=C mod M, wherein C is the number of CBs obtained by the code block segmentation of one TB, and r is the remainder of C divisible by M. According to the different marking ways of the subscript k of the $CBG_k$ (for example, k is marked from 0 to M−1 or k is marked from 1 to M, and of course, k can also be marked in other ways, which are omitted here), the ways in which the first determining unit determines the number $N_k$ of CBs included in $CBG_k$ of the M CBGs can be classified as the ways a1 and b1.

The way a1 is:

$$N_k = \left\lfloor \frac{C}{M} \right\rfloor,$$

wherein $0 \leq k < M-r$; or $$N_k = \left\lfloor \frac{C}{M} \right\rfloor + 1 \text{ or } N_k = \left\lceil \frac{C}{M} \right\rceil,$$

wherein $M-r \leq k < M$.

The way b1 is:

$$N_k = \left\lfloor \frac{C}{M} \right\rfloor,$$

wherein $1 \leq k \leq M-r$; or $$N_k = \left\lfloor \frac{C}{M} \right\rfloor + 1 \text{ or } N_k = \left\lceil \frac{C}{M} \right\rceil,$$

wherein $M-r < k \leq M$.

Specifically, for the way a1, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lfloor 18/4 \rfloor=4$ CBs; $CBG_2$ and $CBG_3$ include $N_2=N_3=\lfloor 18/4 \rfloor+1=5$ CBs, or $CBG_2$ and $CBG_3$ include $N_2=N_3=\lceil 18/4 \rceil=5$ CBs.

Specifically, for the way a1, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$ includes $N_0=\lfloor 19/4 \rfloor=4$ CBs; $CBG_1$, $CBG_2$ and $CBG_3$ include $N_1=N_2=N_3=\lfloor 19/4 \rfloor+1=5$ CBs, or $CBG_1$, $CBG_2$ and $CBG_3$ include $N_1=N_2=N_3=\lceil 19/4 \rceil=5$ CBs.

For the way b1, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lfloor 18/4 \rfloor=4$ CBs; $CBG_3$ and $CBG_4$ include $N_3=N_4=\lfloor 18/4 \rfloor+1=5$ CBs, or $CBG_3$ and $CBG_4$ include $N_3=N_4=\lceil 18/4 \rceil=5$ CBs.

Second Implementation

The third determining subdevice includes a second defining unit and a second determining unit. The second defining unit is configured to define r=C mod M, wherein C is the number of CBs obtained by the code block segmentation of one TB, and r is the remainder of C divisible by M. According to the different marking ways of the subscript k of the $CBG_k$ (for example, k is marked from 0 to M−1 or k is marked from 1 to M, and of course, k can also be marked in other ways, which are omitted here), the ways in which the second determining unit determines the number $N_k$ of CBs included in $CBG_k$ of the M CBGs can be classified as the ways a2 and b2.

The way a2 is:

$$N_k = \left\lceil \frac{C}{M} \right\rceil - 1 \text{ or } N_k = \left\lfloor \frac{C}{M} \right\rfloor,$$

wherein $0 \leq k < M-r$; or $$N_k = \left\lceil \frac{C}{M} \right\rceil,$$

wherein $M-r \leq k < M$.

The way b2 is:

$$N_k = \left\lceil \frac{C}{M} \right\rceil - 1 \text{ or } N_k = \left\lfloor \frac{C}{M} \right\rfloor,$$

wherein $1 \leq k \leq M-r$; or $$N_k = \left\lceil \frac{C}{M} \right\rceil,$$

wherein $M-r < k \leq M$.

Specifically, for the way a2, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil-1=4$ CBs, or $CBG_0$ and $CBG_1$ include $N_0=N_1=\lfloor 18/4 \rfloor=4$ CBs; $CBG_2$ and $CBG_3$ include $N_2=N_3=\lceil 18/4 \rceil=5$ CBs.

Specifically, for the way a2, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$ includes $N_0=\lceil 19/4 \rceil-1=4$ CBs, or $CBG_0$ includes $N_0=\lfloor 19/4 \rfloor=4$ CBs; $CBG_1$, $CBG_2$ and $CBG_3$ include $N_1=N_2=N_3=\lceil 19/4 \rceil=5$ CBs.

For the way b2, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lceil 18/4 \rceil-1=4$ CBs, or $CBG_1$ and $CBG_2$ include $N_1=N_2=\lfloor 18/4 \rfloor=4$ CBs; $CBG_3$ and $CBG_4$ include $N_3=N_4=\lceil 18/4 \rceil=5$ CBs.

Third Implementation

The third determining subdevice includes a third defining unit and a third determining unit. The third defining unit is configured to define r=C mod M, wherein C is the number of CBs obtained by the code block segmentation of one TB, and r is the remainder of C divisible by M. According to the different marking ways of the subscript k of the $CBG_k$ (for example, k is marked from 0 to M−1 or k is marked from 1 to M, and of course, k can also be marked in other ways, which are omitted here), the ways in which the third determining unit determines the number $N_k$ of CBs included in $CBG_k$ of the M CBGs can be classified as the ways a3 and b3.

The way a3 is:

$$N_k = \left\lfloor \frac{C}{M} \right\rfloor + 1 \text{ or } N_k = \left\lceil \frac{C}{M} \right\rceil,$$

wherein $0 \leq k < r$; or $$N_k = \left\lfloor \frac{C}{M} \right\rfloor,$$

wherein r≤k<M.

The way b3 is:

$$N_k = \left\lfloor \frac{C}{M} \right\rfloor + 1 \text{ or } N_k = \left\lceil \frac{C}{M} \right\rceil,$$

wherein 1≤k≤r; or $$N_k = \left\lfloor \frac{C}{M} \right\rfloor,$$

wherein r<k≤M.

Specifically, for the way a3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lfloor 18/4 \rfloor+1=5$ CBs, or $CBG_0$ and $CBG_1$ include $N_0=N_1=\lceil 18/4 \rceil=5$ CBs; $CBG_2$ and $CBG_3$ include $N_2=N_3=\lfloor 18/4 \rfloor=4$ CBs.

Specifically, for the way a3, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lfloor 19/4 \rfloor+1=5$ CBs, or $CBG_0$, $CBG_1$ and $CBG_2$ include $N_0=N_1=N_2=\lceil 19/4 \rceil=5$ CBs; $CBG_3$ includes $N_3=\lfloor 19/4 \rfloor=4$ CBs.

For the way b3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lfloor 18/4 \rfloor+1=5$ CBs, or $CBG_1$ and $CBG_2$ include $N_1=N_2=\lceil 18/4 \rceil=5$ CBs; $CBG_3$ and $CBG_4$ include $N_3=N_4=\lfloor 18/4 \rfloor=4$ CBs.

Fourth Implementation

The third determining subdevice includes a fourth defining unit and a fourth determining unit. The fourth defining unit is configured to define r=C mod M, wherein C is the number of CBs obtained by the code block segmentation of one TB, and r is the remainder of C divisible by M. According to the different marking ways of the subscript k of the $CBG_k$ (for example, k is marked from 0 to M−1 or k is marked from 1 to M, and of course, k can also be marked in other ways, which are omitted here), the ways in which the fourth determining unit determines the number $N_k$ of CBs included in $CBG_k$ of the M CBGs can be classified as the ways a4 and b4.

The way a4 is:

$$N_k = \left\lceil \frac{C}{M} \right\rceil,$$

wherein 0≤k<r; or $$N_k = \left\lceil \frac{C}{M} \right\rceil - 1 \text{ or } N_k = \left\lfloor \frac{C}{M} \right\rfloor,$$

wherein r≤k<M.

The way b4 is:

$$N_k = \left\lceil \frac{C}{M} \right\rceil,$$

wherein 1≤k≤r; or $$N_k = \left\lceil \frac{C}{M} \right\rceil - 1 \text{ or } N_k = \left\lfloor \frac{C}{M} \right\rfloor,$$

wherein r<k≤M.

Specifically, for the way a4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil=5$ CBs; $CBG_2$ and $CBG_3$ include $N_2=N_3=\lceil 18/4 \rceil-1=4$ CBs, or $CBG_2$ and $CBG_3$ include $N_2=N_3=\lfloor 18/4 \rfloor=4$ CBs.

Specifically, for the way a4, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lceil 19/4 \rceil=5$ CBs; $CBG_3$ includes $N_3=\lceil 19/4 \rceil-1=4$ CBs, or $CBG_3$ includes $N_3=\lfloor 19/4 \rfloor=4$ CBs.

For the way b4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lceil 18/4 \rceil=5$ CBs; $CBG_3$ and $CBG_4$ include $N_3=N_4=\lceil 18/4 \rceil-1=4$ CBs, or $CBG_3$ and $CBG_4$ include $N_3=N_4=\lfloor 18/4 \rfloor=4$ CBs.

Here, the number of CBs included in each CBG changes with the change in the Transport Block Size (TBS) of one TB.

The data transmission device 330 is configured to transmit the data based on the M CBGs, which specifically includes: the data transmission device 330 performs the ACK/NACK feedback and/or retransmission based on the M CBGs.

For example, in the case of uplink data transmission, the data transmission device 330 of the user equipment sends one TB; the base station receives one TB, generates A bits of ACK/NACK feedback information according to each of M CBGs obtained after grouping the one TB in accordance with the preset grouping scheme, where A can be a preset value equal to or greater than 1, and sends the feedback information to the user equipment; and after the CBG corresponding to each feedback information is determined according to the same CB grouping scheme, the information in the CBG of which the corresponding feedback information is NACK can be retransmitted.

Or, in the case of downlink data transmission, the base station sends one TB; the user equipment receives one TB, generates A bits of ACK/NACK feedback information according to each of M CBGs obtained after grouping the one TB in accordance with the preset grouping scheme, where A can be a preset value equal to or greater than 1, and sends the feedback information to the base station; and the base station can determine the CBG corresponding to each feedback information according to the same CB grouping scheme after receiving the feedback information, and then retransmit the information in the CBG of which the corresponding feedback information is NACK.

Figure 4:
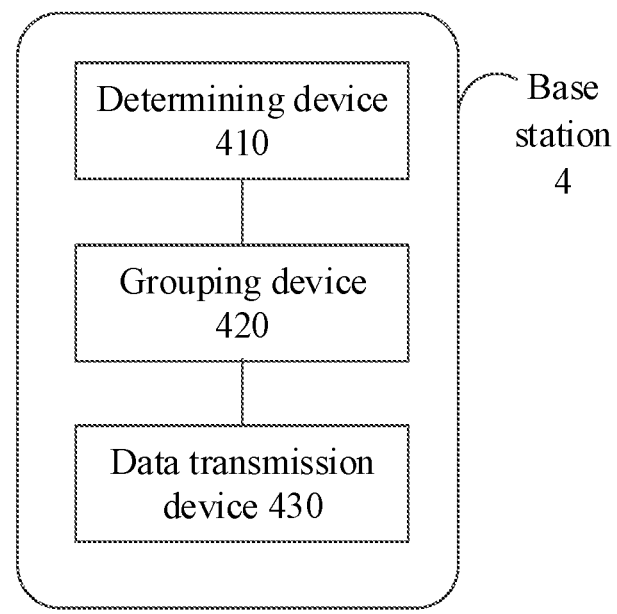
FIG. 4 is a schematic diagram of a base station in accordance with an embodiment of the invention.

Referring to FIG. 4, the fourth embodiment of the invention provides a base station 4 which can implement the method flow performed at the base station side in the above embodiments. The base station 4 includes:

a determining device 410 configured to determine that one TB needs to be divided into M CBGs; a grouping device 420 configured to group one or more CBs obtained by the code block segmentation of the one TB according to the preset grouping scheme, to thereby divide the one TB into the M CBGs; and a data transmission device 430 configured to transmit the data based on the M CBGs, wherein M is a positive integer.

The determining device 410 can include: a first determining subdevice configured to determine according to the predefined rule that one TB needs to be divided into M CBGs; or a second determining subdevice configured to select one of a plurality of predefined M values as the number of CBGs into which one TB needs to be divided, and notify a user equipment of the M value through the configuration information, so that the user equipment can group the TBs at the user equipment side based on the configuration information.

The base station further includes a sending device configured to send the configuration information through the high-level signaling; or configured to send the configuration information through the downlink control channel.

The sending device is further configured to notify the user equipment of the M value through the user equipment-specific configuration information; or notify the user equipment of the M value through the configuration information shared by a plurality of user equipments. The M values corresponding to the TBs with different Transport Block Sizes (TBSs) can be same or different; and the base station can also determine the codebook size as M bits when the ACK/NACK feedback is made on the one TB.

The grouping device 420 includes: a third determining subdevice configured to determine the number of CBs in each of the M CBGs according to the preset grouping scheme; and a grouping subdevice configured to divide the TB into the M CBGs based on the determined number of CBs in each of the M CBGs. That is to say, each of the M CBGs includes a group of CBs. Here, the third determining subdevice can determine the number of CBs in each of the M CBGs according to the preset grouping scheme in four ways as follows (but not limited to these four ways).

First Implementation

The third determining subdevice includes a first defining unit and a first determining unit. The first defining unit is configured to define $r = C \mod M$, wherein C is the number of CBs obtained by the code block segmentation of one TB, and r is the remainder of C divisible by M. According to the different marking ways of the subscript k of the $CBG_k$ (for example, k is marked from 0 to M−1 or k is marked from 1 to M, and of course, k can also be marked in other ways, which are omitted here), the ways in which the first determining unit determines the number $N_k$ of CBs included in $CBG_k$ of the M CBGs can be classified as the ways a1 and b1.

The way a1 is:

$$N_k = \left\lfloor \frac{C}{M} \right\rfloor,$$

wherein $0 \le k < M-r$; or $$N_k = \left\lfloor \frac{C}{M} \right\rfloor + 1 \text{ or } N_k = \left\lceil \frac{C}{M} \right\rceil,$$

wherein $M-r \le k < M$.

The way b1 is:

$$N_k = \left\lfloor \frac{C}{M} \right\rfloor,$$

wherein $1 \le k \le M-r$; or $$N_k = \left\lfloor \frac{C}{M} \right\rfloor + 1 \text{ or } N_k = \left\lceil \frac{C}{M} \right\rceil,$$

wherein $M-r < k \le M$.

Specifically, for the way a1, it is assumed that M=4, one TB is divided into C=18 TBs according to the CB division definition, and $r = 18 \mod 4 = 2$, then in accordance with the above calculation mode, the number $N_k$ of CBs included in $CBG_k$ of 4 CBGs is: $CBG_0$ and $CBG_1$ include $N_0 = N_1 = \lfloor 18/4 \rfloor = 4$ CBs; $CBG_2$ and $CBG_3$ include $N_2 = N_3 = \lfloor 18/4 \rfloor + 1 = 5$ CBs, or $CBG_2$ and $CBG_3$ include $N_2 = N_3 = \lceil 18/4 \rceil = 5$ CBs.

Specifically, for the way a1, it is assumed that M=4, one TB is divided into C=19 TBs according to the CB division definition, and $r = 19 \mod 4 = 3$, then in accordance with the above calculation mode, the number $N_k$ of CBs included in $CBG_k$ of 4 CBGs is: $CBG_0$ includes $N_0 = \lfloor 19/4 \rfloor = 4$ CBs; $CBG_1$, $CBG_2$ and $CBG_3$ include $N_1 = N_2 = N_3 = \lfloor 19/4 \rfloor + 1 = 5$ CBs, or $CBG_1$, $CBG_2$ and $CBG_3$ include $N_1 = N_2 = N_3 = \lceil 19/4 \rceil = 5$ CBs.

For the way b1, it is assumed that M=4, one TB is divided into C=18 TBs according to the CB division definition, and $r = 18 \mod 4 = 2$, then in accordance with the above calculation mode, the number $N_k$ of CBs included in $CBG_k$ of 4 CBGs is: $CBG_1$ and $CBG_2$ include $N_1 = N_2 = \lfloor 18/4 \rfloor = 4$ CBs; $CBG_3$ and $CBG_4$ include $N_3 = N_4 = \lfloor 18/4 \rfloor + 1 = 5$ CBs, or $CBG_3$ and $CBG_4$ include $N_3 = N_4 = \lceil 18/4 \rceil = 5$ CBs.

Second Implementation

The third determining subdevice includes a second defining unit and a second determining unit. The second defining unit is configured to define $r = C \mod M$, wherein C is the number of CBs obtained by the code block segmentation of one TB, and r is the remainder of C is divisible by M. According to the different marking ways of the subscript k of the $CBG_k$ (for example, k is marked from 0 to M−1 or k is marked from 1 to M, and of course, k can also be marked in other ways, which are omitted here), the ways in which the second determining unit determines the number $N_k$ of CBs included in $CBG_k$ of the M CBGs can be classified as the ways a2 and b2.

The way a2 is:

$$N_k = \left\lceil \frac{C}{M} \right\rceil - 1 \text{ or } N_k = \left\lfloor \frac{C}{M} \right\rfloor,$$

wherein $0 \le k < M-r$; or $$N_k = \left\lceil \frac{C}{M} \right\rceil,$$

wherein M−r≤k<M.

The way b2 is:

$$N_k = \left\lceil \frac{C}{M} \right\rceil - 1 \text{ or } N_k = \left\lfloor \frac{C}{M} \right\rfloor,$$

wherein 1≤k≤M−r; or $$N_k = \left\lceil \frac{C}{M} \right\rceil,$$

wherein M−r<k≤M.

Specifically, for the way a2, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil-1=4$ CBs, or $CBG_0$ and $CBG_1$ include $N_0=N_1=\lfloor 18/4 \rfloor=4$ CBs; $CBG_2$ and $CBG_3$ include $N_2=N_3=\lceil 18/4 \rceil=5$ CBs.

Specifically, for the way a2, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$ includes $N_0=\lceil 19/4 \rceil-1=4$ CBs, or $CBG_0$ includes $N_0=\lfloor 19/4 \rfloor=4$ CBs; $CBG_1$, $CBG_2$ and $CBG_3$ include $N_1=N_2=N_3=\lceil 19/4 \rceil=5$ CBs.

For the way b2, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lceil 18/4 \rceil-1=4$ CBs, or $CBG_1$ and $CBG_2$ include $N_1=N_2=\lfloor 18/4 \rfloor=4$ CBs; $CBG_3$ and $CBG_4$ include $N_3=N_4=\lceil 18/4 \rceil=5$ CBs.

Third Implementation

The third determining subdevice includes a third defining unit and a third determining unit. The third defining unit is configured to define r=C mod M, wherein C is the number of CBs obtained by the code block segmentation of one TB, and r is the remainder of C divisible by M. According to the different marking ways of the subscript k of the $CBG_k$ (for example, k is marked from 0 to M−1 or k is marked from 1 to M, and of course, k can also be marked in other ways, which are omitted here), the ways in which the third determining unit determines the number $N_k$ of CBs included in $CBG_k$ of the M CBGs can be classified as the ways a3 and b3.

The way a3 is:

$$N_k = \left\lfloor \frac{C}{M} \right\rfloor + 1 \text{ or } N_k = \left\lceil \frac{C}{M} \right\rceil,$$

wherein 0≤k<r; or $$N_k = \left\lfloor \frac{C}{M} \right\rfloor,$$

wherein r≤k<M.

The way b3 is:

$$N_k = \left\lfloor \frac{C}{M} \right\rfloor + 1 \text{ or } N_k = \left\lceil \frac{C}{M} \right\rceil,$$

wherein 1≤k≤r; or $$N_k = \left\lfloor \frac{C}{M} \right\rfloor,$$

wherein r<k≤M.

Specifically, for the way a3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lfloor 18/4 \rfloor+1=5$ CBs, or $CBG_0$ and $CBG_1$ include $N_0=N_1=\lceil 18/4 \rceil=5$ CBs; $CBG_2$ and $CBG_3$ include $N_2=N_3=\lfloor 18/4 \rfloor=4$ CBs.

Specifically, for the way a3, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lfloor 19/4 \rfloor+1=5$ CBs, or $CBG_0$, $CBG_1$ and $CBG_2$ include $N_0=N_1=N_2=\lceil 19/4 \rceil=5$ CBs; $CBG_3$ includes $N_3=\lfloor 19/4 \rfloor=4$ CBs.

For the way b3, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lfloor 18/4 \rfloor+1=5$ CBs, or $CBG_1$ and $CBG_2$ include $N_1=N_2=\lceil 18/4 \rceil=5$ CBs; $CBG_3$ and $CBG_4$ include $N_3=N_4=\lfloor 18/4 \rfloor=4$ CBs.

Fourth Implementation

The third determining subdevice includes a fourth defining unit and a fourth determining unit. The fourth defining unit is configured to define r=C mod M, wherein C is the number of CBs obtained by the code block segmentation of one TB, and r is the remainder of C divisible by M. According to the different marking ways of the subscript k of the $CBG_k$ (for example, k is marked from 0 to M−1 or k is marked from 1 to M, and of course, k can also be marked in other ways, which are omitted here), the ways in which the fourth determining unit determines the number $N_k$ of CBs included in $CBG_k$ of the M CBGs can be classified as the ways a4 and b4.

The way a4 is:

$$N_k = \left\lceil \frac{C}{M} \right\rceil,$$

wherein 0≤k<r; or $$N_k = \left\lceil \frac{C}{M} \right\rceil - 1 \text{ or } N_k = \left\lfloor \frac{C}{M} \right\rfloor,$$

wherein r≤k<M.

The way b4 is:

$$N_k = \left\lceil \frac{C}{M} \right\rceil,$$

wherein 1≤k≤r; or $$N_k = \left\lceil \frac{C}{M} \right\rceil - 1 \text{ or } N_k = \left\lfloor \frac{C}{M} \right\rfloor,$$

wherein r<k≤M.

Specifically, for the way a4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_0$ and $CBG_1$ include $N_0=N_1=\lceil 18/4 \rceil=5$ CBs; $CBG_2$ and $CBG_3$ include $N_2=N_3=\lceil 18/4 \rceil-1=4$ CBs, or $CBG_2$ and $CBG_3$ include $N_2=N_3=\lfloor 18/4 \rfloor=4$ CBs.

Specifically, for the way a4, it is assumed that M=4, one TB is divided into C=19 TBs according to the CB division definition, and r=19 mod 4=3, then in accordance with the above calculation mode, the number $N_k$ of CBs included in $CBG_k$ of 4 CBGs is: $CBG_0$, $CBG_1$ and $CBG_2$ include $N_0=N_1=N_2=\lceil 19/4 \rceil=5$ CBs; $CBG_3$ includes $N_3=\lceil 19/4 \rceil-1=4$ CBs, or $CBG_3$ includes $N_3=\lfloor 19/4 \rfloor=4$ CBs.

For the way b4, it is assumed that M=4, one TB is divided into C=18 TBs according to the CB division definition, and r=18 mod 4=2, then in accordance with the above calculation mode, the number $N_k$ of CBs included in $CBG_k$ of 4 CBGs is: $CBG_1$ and $CBG_2$ include $N_1=N_2=\lceil 18/4 \rceil=5$ CBs; $CBG_3$ and $CBG_4$ include $N_3=N_4=\lceil 18/4 \rceil-1=4$ CBs, or $CBG_3$ and $CBG_4$ include $N_3=N_4=\lfloor 18/4 \rfloor=4$ CBs.

Here, the number of CBs included in each CBG changes with the change in the Transport Block Size (TBS) of one TB.

The data transmission device 430 is configured to transmit the data based on the M CBGs, which specifically includes: the data transmission device 430 performs the ACK/NACK feedback and/or retransmission based on the M CBGs.

For example, in the case of uplink data transmission, the user equipment sends one TB; the base station receives one TB, generates A bits of ACK/NACK feedback information according to each of M CBGs obtained after grouping the one TB in accordance with the preset grouping scheme, where A can be a preset value equal to or greater than 1, and sends the feedback information to the user equipment; and the user equipment can determine the CBG corresponding to each feedback information according to the same CB grouping scheme after receiving the feedback information, and then retransmit the information in the CBG of which the corresponding feedback information is NACK.

Or, in the case of downlink data transmission, the data transmission device 430 of the base station sends one TB; the user equipment receives one TB, generates A bits of ACK/NACK feedback information according to each of M CBGs obtained after grouping the one TB in accordance with the preset grouping scheme, where A can be a preset value equal to or greater than 1, and sends the feedback information to the base station; and the base station can determine the CBG corresponding to each feedback information according to the same CB grouping scheme after receiving the feedback information, and then retransmit the information in the CBG of which the corresponding feedback information is NACK.

The fifth embodiment of the invention provides a computer device, which includes a processor which is configured, when executing a computer program stored in a memory, to implement the steps of the method described in the first or second embodiment of the invention.

Figure 5:
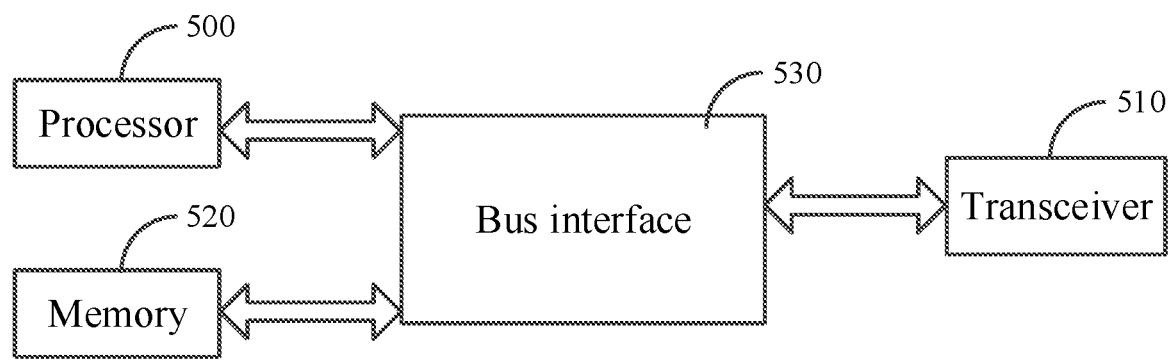
FIG. 5 is a schematic diagram of another user equipment in accordance with an embodiment of the invention.

As shown in FIG. 5, the device can implement the functions of the user equipment side described in the above embodiments. The device can include a transceiver 510 and at least one processor 500 connected with the transceiver, wherein:

the processor 500 is configured to read the program in a memory 520 to perform the processes of: determining that one TB needs to be divided into M CBGs; grouping one or more CBs obtained by the code block segmentation of the one TB according to the preset grouping scheme to thereby divide the one TB into the M CBGs; and transmitting the data based on the M CBGs. Here, M is a positive integer.

Here, in FIG. 5, the Bus Architecture can Include any Numbers of Interconnected Buses and bridges, and specifically link various circuits of one or more processors represented by the processor 500 and the memory represented by the memory 520. The bus architecture can further link various other circuits such as peripheral device, voltage regulator and power management circuit, which are all well known in the art and thus will not be further described again herein. The bus interface 530 provides an interface. The transceiver 510 can be a plurality of elements, i.e., include a transmitter and a receiver, and provide the units for communicating with various other devices over the transmission media. The processor 500 is responsible for managing the bus architecture and general processing, and can further provide various functions including timing, peripheral interface, voltage regulation, power management and other control functions. The memory 520 can store the data used by the processor 500 when performing the operations.

Optionally, the processor 500 can be CPU, ASIC, FPGA or CPLD.

In an embodiment of the invention, the processor 500 reads the program in the memory 520 to perform the method in the embodiment as shown in FIG. 1, which specifically refers to the relative description in the embodiment as shown in FIG. 1 and will be omitted here.

Figure 6:
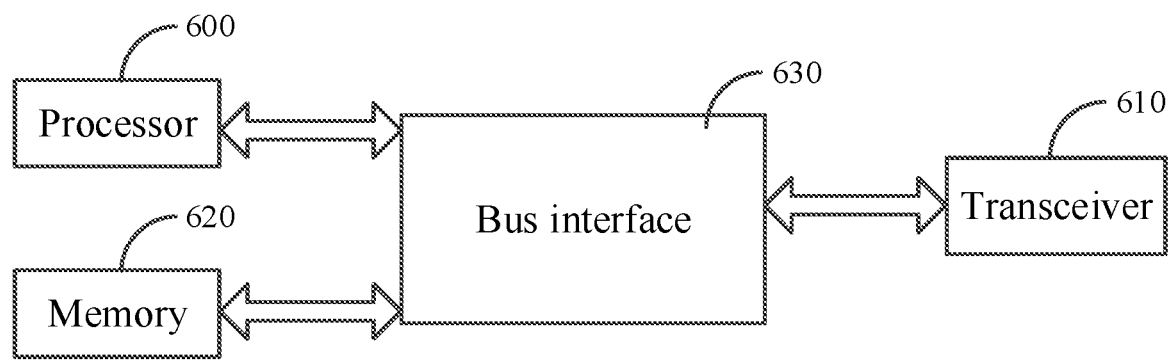
FIG. 6 is a schematic diagram of another base station in accordance with an embodiment of the invention.

As shown in FIG. 6, the device can implement the functions of the base station side described in the above embodiments. The device can include a transceiver 610 and at least one processor 600 connected with the transceiver, wherein:

the processor 600 is configured to read the program in a memory 620 to perform the processes of: determining that one TB needs to be divided into M CBGs; grouping one or more CBs obtained by the code block segmentation of the one TB according to the preset grouping scheme to thereby divide the one TB into the M CBGs; and transmitting the data based on the M CBGs. Here, M is a positive integer.

Here, in FIG. 6, the bus architecture can include any numbers of interconnected buses and bridges, and specifically link various circuits of one or more processors represented by the processor 600 and the memory represented by the memory 620. The bus architecture can further link various other circuits such as peripheral device, voltage regulator and power management circuit, which are all well known in the art and thus will not be further described again herein. The bus interface 630 provides an interface. The transceiver 610 can be a plurality of elements, i.e., include a transmitter and a receiver, and provide the units for communicating with various other devices over the transmission media. The processor 600 is responsible for managing the bus architecture and general processing, and can further provide various functions including timing, peripheral interface, voltage regulation, power management and other control functions. The memory 620 can store the data used by the processor 600 when performing the operations.

Optionally, the processor 600 can be CPU, ASIC, FPGA or CPLD.

In an embodiment of the invention, the processor 600 reads the program in the memory 620 to perform the method in the embodiment as shown in FIG. 2, which specifically refers to the relative description in the embodiment as shown in FIG. 2 and will be omitted here.

The sixth embodiment of the invention provides a computer readable storage medium storing a computer program thereon, where the computer program, when executed by a processor, implement the steps of the method described in the first or second embodiment of the invention.

The technical solutions in the above embodiments of the invention have at least the following technical effects or advantages: in the data transmission method, user equipment, and base station in the embodiments of the invention, the CBs can be divided into the CBGs, to support the CBG-based retransmission and ACK/NACK feedback, solve the above technical problem in the prior art, and achieve the technical effect of reducing the unnecessary retransmission redundancy and increasing the transmission efficiency when performing the data transmission in the LTE system.

Although the embodiments of the invention have been described, those skilled in the art can make additional alterations and modifications to these embodiments once they learn about the basic creative concepts. Thus the attached claims are intended to be interpreted to include the embodiments as well as all the alterations and modifications falling within the scope of the invention.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A data transmission method, comprising:
   determining, by a user equipment, that one Transport Block, TB, needs to be divided into M Code Block Groups, CBGs, wherein M is a positive integer;
   grouping, by the user equipment, one or more Code Blocks, CBs, obtained by code block segmentation of the one TB according to a preset grouping scheme to thereby divide the one TB into the M CBGs; and
   transmitting, by the user equipment, data based on the M CBGs;
   wherein grouping, by the user equipment, one or more CBs obtained by code block segmentation of the one TB according to a preset grouping scheme to thereby divide the TB into the M CBGs, comprises:
   determining, by the user equipment, the number of CBs in each of the M CBGs according to the preset grouping scheme;
   dividing, by the user equipment, the TB into the M CBGs based on the determined number of CBs in each of the M CBGs;
   wherein determining, by the user equipment, the number of CBs in each of the M CBGs according to the preset grouping scheme, comprises one of the following schemes:
   Scheme1:
   defining, by the user equipment, $r = C \bmod M$, wherein C is the number of CBs obtained by code block segmentation of one TB, and r is a remainder of C divisible by M;
   determining, by the user equipment, the number $N_k$ of CBs included in $CBG_k$ of the M CBGs as:

$$N_k = \left\lfloor \frac{C}{M} \right\rfloor,$$

wherein k is an integer greater than or equal to 0 and less than M-r;

$$N_k = \left\lfloor \frac{C}{M} \right\rfloor + 1 \text{ or } N_k = \left\lceil \frac{C}{M} \right\rceil,$$

wherein k is an integer greater than or equal to M-r and less than M,
   Scheme2:
   defining $r = C \bmod M$, wherein C is the number of CBs obtained by code block segmentation of one TB, and r is a remainder of C divisible by M,
   determining, by the user equipment, the number $N_k$ of CBs included in $CBG_k$ of the M CBGs as:

$$N_k = \left\lceil \frac{C}{M} \right\rceil - 1 \text{ or } N_k = \left\lfloor \frac{C}{M} \right\rfloor,$$

wherein k is an integer greater than or equal to 0 and less than M-r;

$$N_k = \left\lceil \frac{C}{M} \right\rceil,$$

wherein k is an integer greater than or equal to M-r and less than M,
   Scheme3:
   defining $r = C \bmod M$, wherein C is the number of CBs obtained by code block segmentation of one TB, and r is a remainder of C divisible by M,
   determining, by the user equipment, the number $N_k$ of CBs included in $CBG_k$ of the M CBGs as:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than r;

$$N_k = \left\lfloor \frac{C}{M} \right\rfloor,$$

wherein k is an integer greater than or equal to r and less than M;
   Scheme4:
   defining $r = C \bmod M$, wherein C is the number of CBs obtained by code block segmentation of one TB, and r is a remainder of C divisible by M;
   determining, by the user equipment, the number $N_k$ of CBs included in $CBG_k$ of the M CBGs as:

$$N_k = \left\lceil \frac{C}{M} \right\rceil,$$

wherein k is an integer greater than or equal to 0 and less than r;

$$N_k = \left\lceil \frac{C}{M} \right\rceil - 1 \text{ or } N_k = \left\lfloor \frac{C}{M} \right\rfloor,$$

wherein k is an integer greater than or equal to r and less than M.

2. The method of claim 1, wherein determining, by the user equipment, that one TB needs to be divided into M CBGs, comprises:
determining, by the user equipment, according to a predefined rule that one TB needs to be divided into M CBGs; or
determining, by the user equipment, according to configuration information that one TB needs to be divided into M CBGs.

3. The method of claim 2, further comprising:
receiving, by the user equipment, the configuration information through a high-level signaling; or
receiving, by the user equipment, the configuration information through a downlink control channel;
wherein the configuration information comprises:
a user equipment-specific configuration information; or
configuration information shared by a plurality of user equipment, wherein the user equipment is one of the plurality of user equipment.

4. A data transmission method, comprising:
determining, by a base station, that one Transport Block, TB, needs to be divided into M Code Block Groups, CBGs, wherein M is a positive integer;
grouping, by the base station, one or more Code Blocks, CBs, obtained by code block segmentation of the one TB according to a preset grouping scheme to thereby divide the one TB into the M CBGs; and
transmitting, by the base station, data based on the M CBGs;
wherein grouping, by the base station, one or more CBs obtained by code block segmentation of the one TB according to a preset grouping scheme to thereby divide the TB into the M CBGs, comprises:
determining, by the base station, the number of CBs in each of the M CBGs according to the preset grouping scheme;
dividing, by the base station, the TB into the M CBGs based on the determined number of CBs in each of the M CBGs;
wherein determining, by the base station, the number of CBs in each of the M CBGs according to the preset grouping scheme, comprises one of the following schemes:
Scheme1:
defining, by the base station, r=C mod M, wherein C is the number of CBs obtained by code block segmentation of one TB, and r is a remainder of C divisible by M;
determining, by the base station, the number $N_k$ of CBs included in $CBG_k$ of the M CBGs as:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than M-r;

$$N_k = \left\lfloor \frac{C}{M} \right\rfloor + 1,$$

wherein k is an integer greater than or equal to M-r and less than M;

Scheme2:
defining r=C mod M, wherein C is the number of CBs obtained by code block segmentation of one TB, and r is a remainder of C divisible by M;
determining, by the base station, the number $N_k$ of CBs included in $CBG_k$ of the M CBGs as:

$$N_k = \left\lceil \frac{C}{M} \right\rceil - 1 \text{ or } N_k = \left\lfloor \frac{C}{M} \right\rfloor,$$

wherein k is an integer greater than or equal to 0 and less than M-r;

$$N_k = \left\lceil \frac{C}{M} \right\rceil,$$

wherein k is an integer greater than or equal to M-r and less than M;

Scheme3:
defining r=C mod M, wherein C is the number of CBs obtained by code block segmentation of one TB, and r is a remainder of C divisible by M;
determining, by the base station, the number $N_k$ of CBs included in $CBG_k$ of the M CBGs as:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than r;

$$N_k = \left\lfloor \frac{C}{M} \right\rfloor,$$

wherein k is an integer greater than or equal to r and less than M;

Scheme4:
defining r=C mod M, wherein C is the number of CBs obtained by code block segmentation of one TB, and r is a remainder of C divisible by M;
determining, by the base station, the number $N_k$ of CBs included in $CBG_k$ of the M CBGs as:

$$N_k = \left\lceil \frac{C}{M} \right\rceil,$$

wherein k is an integer greater than or equal to 0 and less than r;

$$N_k = \left\lceil \frac{C}{M} \right\rceil - 1 \text{ or } N_k = \left\lfloor \frac{C}{M} \right\rfloor,$$

wherein k is an integer greater than or equal to r and less than M.

5. The method of claim 4, wherein determining, by the base station, that one TB needs to be divided into M CBGs, comprises:
determining, by the base station, according to a predefined rule that one TB needs to be divided into M CBGs; or
selecting, by the base station, one of a plurality of predefined M values as the number of CBGs into which one TB needs to be divided, and notifying a user equipment of the M value through configuration information.

6. The method of claim 5, further comprising:
sending, by the base station, the configuration information through a high-level signaling; or
sending, by the base station, the configuration information through a downlink control channel;
wherein the method further comprises:
notifying, by the base station, the user equipment of the M value through a user equipment-specific configuration information; or
notifying, by the base station, the user equipment of the M value through configuration information shared by a plurality of user equipment.

7. A user equipment, comprising: a memory and a processor, wherein:
the processor is configured, when executing a computer program stored in the memory, to determine that one Transport Block, TB, needs to be divided into M Code Block Groups, CBGs, wherein M is a positive integer; group one or more Code Blocks, CBs, obtained by code block segmentation of the one TB according to a preset grouping scheme to thereby divide the one TB into the M CBGs; and transmit data based on the M CBGs;
wherein the processor is configured to:
determine the number of CBs in each of the M CBGs according to the preset grouping scheme;
divide the TB into the M CBGs based on the determined number of CBs in each of the M CBGs;
wherein the processor configured to determine the number of CBs in each of the M CBGs according to the preset grouping scheme comprises one of the following schemes:
Scheme1:
the processor is configured to define r=C mod M, wherein C is the number of CBs obtained by code block segmentation of one TB, and r is a remainder of C divisible by M;
determine the number $N_k$ of CBs included in $CBG_k$ of the M CBGs, the $N_k$ being:

$$N_k = \left\lfloor \frac{C}{M} \right\rfloor,$$

wherein k is an integer greater than or equal to 0 and less than M-r;

$$N_k = \left\lfloor \frac{C}{M} \right\rfloor + 1 \text{ or } N_k = \left\lceil \frac{C}{M} \right\rceil,$$

wherein k is an integer greater than or equal to M-r and less than M;
Scheme2:
the processor is configured to define r=C mod M, wherein C is the number of CBs obtained by code block segmentation of one TB, and r is a remainder of C divisible by M;
determine the number $N_k$ of CBs included in $CBG_k$ of the M CBGs, the $N_k$ being:

$$N_k = \left\lceil \frac{C}{M} \right\rceil - 1 \text{ or } N_k = \left\lfloor \frac{C}{M} \right\rfloor,$$

wherein k is an integer greater than or equal to 0 and less than M-r;

$$N_k = \left\lceil \frac{C}{M} \right\rceil,$$

wherein k is an integer greater than or equal to M-r and less than M;
Scheme3:
the processor is configured to define r=C mod M, wherein C is the number of CBs obtained by code block segmentation of one TB, and r is a remainder of C divisible by M;
determine the number $N_k$ of CBs included in $CBG_k$ of the M CBGs, the $N_k$ being:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than r;

$$N_k = \left\lfloor \frac{C}{M} \right\rfloor,$$

wherein k is an integer greater than or equal to r and less than M;
Scheme4:
the processor is configured to define r=C mod M, wherein C is the number of CBs obtained by code block segmentation of one TB, and r is a remainder of C divisible by M;
determine the number $N_k$ of CBs included in $CBG_k$ of the M CBGs, the $N_k$ being:

$$N_k = \left\lceil \frac{C}{M} \right\rceil,$$

wherein k is an integer greater than or equal to 0 and less than M-r;

$$N_k = \left\lceil \frac{C}{M} \right\rceil - 1 \text{ or } N_k = \left\lfloor \frac{C}{M} \right\rfloor,$$

wherein k is an integer greater than or equal to r and less than M.

8. The user equipment of claim 7, wherein the processor is configured to:
   determine according to a predefined rule that one TB needs to be divided into M CBGs; or
   determine according to configuration information that one TB needs to be divided into M CBGs.

9. The user equipment of claim 8, wherein the processor is further configured to:
   receive the configuration information through a high-level signaling; or configured to receive the configuration information through a downlink control channel;
   wherein the configuration information comprises:
   a user equipment-specific configuration information; or
   configuration information shared by a plurality of user equipment, wherein the user equipment is one of the plurality of user equipment.

10. A base station, comprising a memory and a processor, wherein:
    the processor is configured, when executing a computer program stored in the memory, to determine that one Transport Block, TB, needs to be divided into M Code Block Groups, CBGs, wherein M is a positive integer;
    group one or more Code Blocks, CBs, obtained by code block segmentation of the one TB according to a preset grouping scheme to thereby divide the one TB into the M CBGs; and
    transmit data based on the M CBGs;
    wherein the processor is configured to:
    determine the number of CBs in each of the M CBGs according to the preset grouping scheme;
    divide the TB into the M CBGs based on the determined number of CBs in each of the M CBGs;
    wherein the processor configured to determine the number of CBs in each of the M CBGs according to the preset grouping scheme comprises one of the following schemes:
    Scheme1:
    the processor is configured to define r=C mod M, wherein C is the number of CBs obtained by code block segmentation of one TB, and r is a remainder of C divisible by M;
    determine the number $N_k$ of CBs included in $CBG_k$ of the M CBGs, the $N_k$ being:

$$N_k = \left\lfloor \frac{C}{M} \right\rfloor,$$

wherein k is an integer greater than or equal to 0 and less than M-r;

$$N_k = \left\lfloor \frac{C}{M} \right\rfloor + 1 \text{ or } N_k = \left\lceil \frac{C}{M} \right\rceil,$$

wherein k is an integer greater than or equal to M-r and less than M;

Scheme2:
the processor is configured to define r=C mod M, wherein C is the number of CBs obtained by code block segmentation of one TB, and r is a remainder of C divisible by M;
determine the number $N_k$ of CBs included in $CBG_k$ of the M CBGs, the $N_k$ being:

$$N_k = \left\lceil \frac{C}{M} \right\rceil - 1 \text{ or } N_k = \left\lfloor \frac{C}{M} \right\rfloor,$$

wherein k is an integer greater than or equal to 0 and less than M-r;

$$N_k = \left\lceil \frac{C}{M} \right\rceil,$$

wherein k is an integer greater than or equal to M-r and less than M;

Scheme3:
the processor is configured to define r=C mod M, wherein C is the number of CBs obtained by code block segmentation of one TB, and r is a remainder of C divisible by M;
determine the number $N_k$ of CBs included in $CBG_k$ of the M CBGs, the $N_k$ being:

$$N_k = \left\lfloor \frac{C}{M} \right\rfloor + 1 \text{ or } N_k = \left\lceil \frac{C}{M} \right\rceil,$$

wherein k is an integer greater than or equal to 0 and less than r;

$$N_k = \left\lfloor \frac{C}{M} \right\rfloor,$$

wherein k is an integer greater than or equal to r and less than M;

Scheme4:
the processor is configured to define r=C mod M, wherein C is the number of CBs obtained by code block segmentation of one TB, and r is a remainder of C divisible by M;
determine the number $N_k$ of CBs included in $CBG_k$ of the M CBGs, the $N_k$ being:

$$N_k = \left\lceil \frac{C}{M} \right\rceil,$$

wherein k is an integer greater than or equal to 0 and less than r;

$$N_k = \left\lceil \frac{C}{M} \right\rceil - 1 \text{ or } N_k = \left\lfloor \frac{C}{M} \right\rfloor,$$

wherein k is an integer greater than or equal to r and less than M.

11. The base station of claim 10, wherein the processor is configured to:
    determine according to a predefined rule that one TB needs to be divided into M CBGs; or
    select one of a plurality of predefined M values as the number of CBGs into which one TB needs to be divided, and notify a user equipment of the M value through configuration information.

12. The base station of claim 11, wherein the processor is configured to:
send the configuration information through a high-level signaling; or send the configuration information through a downlink control channel;
wherein the processor is further configured to:
notify the user equipment of the M value through a user equipment-specific configuration information; or
notify the user equipment of the M value through configuration information shared by a plurality of user equipment.

* * * * *